(12) United States Patent
Strobel

(10) Patent No.: US 12,117,834 B2
(45) Date of Patent: Oct. 15, 2024

(54) TECHNIQUES FOR ADDRESSING UNFAVORABLE ROAD CONDITIONS IN AUTONOMOUS TRUCKING APPLICATIONS

(71) Applicant: Waymo LLC, Mountain View, CA (US)

(72) Inventor: Andre Strobel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 61 days.

(21) Appl. No.: 17/537,292

(22) Filed: Nov. 29, 2021

(65) Prior Publication Data

US 2022/0171389 A1    Jun. 2, 2022

Related U.S. Application Data

(60) Provisional application No. 63/199,005, filed on Dec. 1, 2020.

(51) Int. Cl.
   *G05D 1/00*     (2024.01)
   *B60G 17/016*   (2006.01)
   (Continued)

(52) U.S. Cl.
   CPC ......... *G05D 1/0088* (2013.01); *B60G 17/016* (2013.01); *B60Q 1/04* (2013.01);
   (Continued)

(58) Field of Classification Search
   CPC .............. B60G 17/016; B60G 2400/82; B60G 2401/142; B60G 2401/174; B60G 17/0165; B60G 17/0195; B60Q 1/04; B60Q 1/30; B60Q 1/34; B60Q 1/46; B60Q 1/52; B60Q 7/005; B60W 10/20; B60W 30/143; B60W 30/18163; B60W 40/06; B60W 40/072; B60W 40/12; B60W 60/001; B60W 60/00182; B60W 2300/12; B60W 2420/42; B60W 2420/52; B60W 2420/54; B60W 2510/222; B60W 2555/20; B60W 2300/125; B60W 2554/406; B60W 60/0025; B62D 35/00; G01S 13/931;
   (Continued)

(56) References Cited

U.S. PATENT DOCUMENTS 9,488,979 B1 * 11/2016 Chambers ............ G05D 1/0088
10,078,964 B2 *  9/2018 Li ......................... H04W 4/027
(Continued)

FOREIGN PATENT DOCUMENTS

DE      102012002581 A1 *  8/2013 ............ B60W 30/12
WO   WO-2017029775 A1 *  2/2017 ......... G01C 21/3407
(Continued)

*Primary Examiner* — Jelani A Smith
*Assistant Examiner* — Nada Mahyoob Alqaderi
(74) *Attorney, Agent, or Firm* — Lowenstein Sandler LLP

(57) ABSTRACT

Aspects and implementations of the present disclosure relate to performance and safety improvements for autonomous trucking systems, including techniques of obtaining an identification of an unfavorable condition on a route of an autonomous vehicle (AV), causing the AV to exit the route, and performing one or more waiting loops until the unfavorable condition is resolved, the AV is rerouted, assistance arrives, and the like.

20 Claims, 10 Drawing Sheets

(51) Int. Cl.
*B60Q 1/04* (2006.01)
*B60Q 1/30* (2006.01)
*B60Q 1/34* (2006.01)
*B60W 10/20* (2006.01)
*B60W 30/14* (2006.01)
*B60W 30/18* (2012.01)
*B60W 40/06* (2012.01)
*B60W 40/072* (2012.01)
*B60W 40/12* (2012.01)
*B60W 60/00* (2020.01)
*B62D 35/00* (2006.01)
*G01S 13/931* (2020.01)
*G01S 15/931* (2020.01)
*G01S 17/931* (2020.01)
*G09F 7/00* (2006.01)

(52) U.S. Cl.
CPC ............... *B60Q 1/30* (2013.01); *B60Q 1/34* (2013.01); *B60W 10/20* (2013.01); *B60W 30/143* (2013.01); *B60W 30/18163* (2013.01); *B60W 40/06* (2013.01); *B60W 40/072* (2013.01); *B60W 40/12* (2013.01); *B60W 60/001* (2020.02); *B60W 60/00182* (2020.02); *B62D 35/00* (2013.01); *G01S 13/931* (2013.01); *G01S 15/931* (2013.01); *G01S 17/931* (2020.01); *G09F 7/00* (2013.01); B60W 2300/12 (2013.01); B60W 2420/403 (2013.01); B60W 2420/408 (2024.01); B60W 2420/54 (2013.01); B60W 2510/222 (2013.01); B60W 2555/20 (2020.02); G01S 2013/9315 (2020.01)

(58) Field of Classification Search
CPC .............. G01S 15/931; G01S 17/931; G01S 2013/9315; G01S 13/862; G01S 13/865; G01S 13/867; G01S 17/86; G09F 7/00; G01C 21/3461
See application file for complete search history.

(56) References Cited

U.S. PATENT DOCUMENTS

| | | | |
|---|---|---|---|
| 10,248,120 B1* | 4/2019 | Siegel | G05D 1/0223 |
| 10,486,485 B1 | 11/2019 | Levinson et al. | |
| 11,747,828 B2* | 9/2023 | Urano | G05D 1/0223 |
| | | | 701/23 |
| 2018/0015801 A1 | 1/2018 | Mohamed et al. | |
| 2018/0218226 A1* | 8/2018 | Wellington | G06V 20/56 |
| 2019/0061780 A1* | 2/2019 | Han | G05D 1/0061 |
| 2019/0079539 A1 | 3/2019 | Sridhar et al. | |
| 2019/0145053 A1* | 5/2019 | Sninchak | E01C 1/04 |
| | | | 404/1 |
| 2019/0333390 A1* | 10/2019 | Woodrow | G06Q 50/40 |
| 2020/0056895 A1* | 2/2020 | Nagy | G05D 1/0221 |
| 2020/0130711 A1* | 4/2020 | Turek | G05D 1/0088 |
| 2020/0324778 A1* | 10/2020 | Diamond | G01C 21/3819 |
| 2020/0384980 A1 | 12/2020 | Yu et al. | |
| 2021/0272018 A1* | 9/2021 | Casas | G06N 20/00 |
| 2022/0105772 A1 | 4/2022 | Kim et al. | |
| 2022/0281456 A1* | 9/2022 | Giovanardi | G01S 17/931 |
| 2022/0340122 A1* | 10/2022 | Diamond | G01C 21/3453 |
| 2022/0355819 A1 | 11/2022 | Yu et al. | |
| 2022/0363102 A1 | 11/2022 | Min | |
| 2022/0363289 A1 | 11/2022 | Nehmadi et al. | |
| 2022/0388363 A1 | 12/2022 | Zhang et al. | |
| 2023/0184563 A1 | 6/2023 | Arreaza et al. | |

FOREIGN PATENT DOCUMENTS

| | | | | |
|---|---|---|---|---|
| WO | WO-2019220235 A1 * | 11/2019 | ............ | B60W 40/06 |
| WO | WO-2021121583 A1 * | 6/2021 | ........... | B60W 30/188 |

* cited by examiner

TECHNIQUES FOR ADDRESSING UNFAVORABLE ROAD CONDITIONS IN AUTONOMOUS TRUCKING APPLICATIONS

RELATED APPLICATIONS

This application claims the benefit of U.S. Provisional Application No. 63/199,005, filed Dec. 1, 2020, the entire contents of which is being incorporated herein by reference.

BACKGROUND

The instant specification generally relates to autonomous vehicles. More specifically, the instant specification relates to performance and safety improvements for autonomous trucking systems, such as waiting loops for unfavorable driving conditions, automatic placement of emergency signaling devices, and methods of enhanced illumination of stranded vehicles.

BACKGROUND

An autonomous vehicle operates by sensing an outside environment with various sensors and charting a driving path through the environment based on the sensed data, Global Positioning System (GPS) data, and road map data. Among the autonomous vehicles are trucks used for long-distance load deliveries. Trucking industry is sensitive to various operational costs and fuel costs, in particular. Autonomous trucks have to meet high standards of safety, which can include both the standards common for all vehicles (driver-operated and autonomously driven alike) as well as additional standards specific for autonomous trucks. Various solutions that improve fuel efficiency, performance, and safety have to be designed without reliance on visual perception, driving experience, and decision-making abilities of a human operator.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1A:
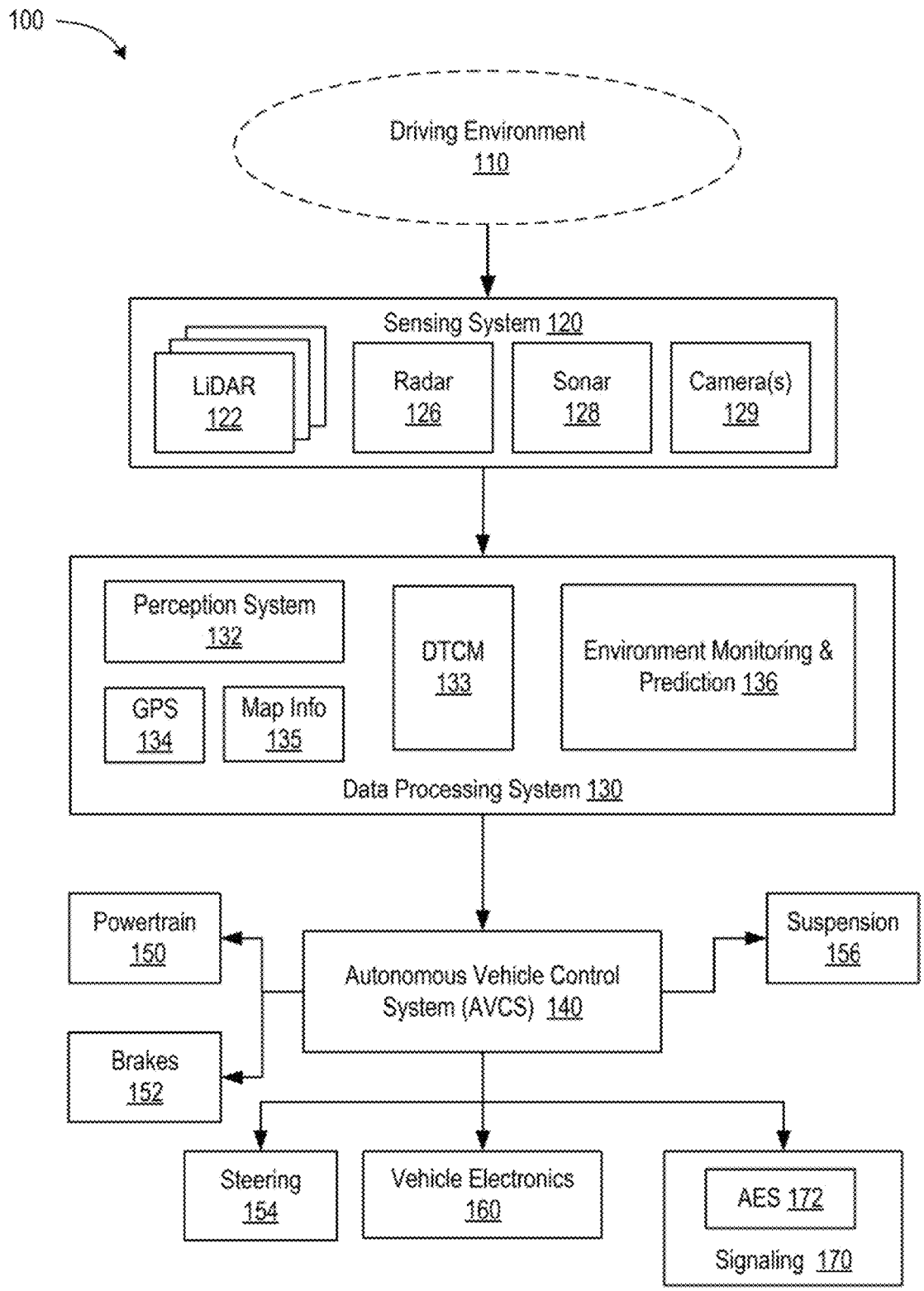
FIG. 1A is a diagram illustrating components of an example autonomous vehicle, such as an autonomously driven truck, that uses sensing and perception technology to support autonomous driving operations, in accordance with some implementations of the present disclosure.

In one implementation, disclosed in a method to operate an autonomous vehicle (AV), the method including: maintaining, by a data processing system of the AV, the AV on a highway, wherein the highway is a part of a first route to a route destination; obtaining, by the data processing system of the AV, an identification of an unfavorable condition for the first route; responsive to the obtained identification of the unfavorable condition, identifying a temporary route, the temporary route comprising a loop between a first location and a second location; using an AV control system of the AV to cause the AV to follow the temporary route for a period of time; and making a determination to direct the AV to one of i) the first route or ii) a second route to the route destination.

In one implementation, disclosed is a method to operate an autonomous vehicle (AV), the method including: maintaining, by a data processing system of the AV, the AV on a highway, wherein the highway is a part of a first route, the first route having a route destination; obtaining, by the data processing system of the AV, an identification of an unfavorable condition for the first route; responsive to the obtained identification of the unfavorable condition, using an AV control system of the AV to cause the AV to exit the highway at a first highway exit; and perform a plurality of driving operations comprising: a first set of driving operations, wherein each of the first set of driving operations increases distance from the AV to the route destination, and a second set of driving operations, wherein each of the second set of driving operations decreases distance from the AV to the route destination.

In another implementation, disclosed is a system that includes: an autonomous vehicle (AV) control system of the AV; a data processing system of the AV, communicatively coupled to the AV control system, wherein the data processing system is configured to: maintain the AV on a highway, wherein the highway is a part of a first route, the first route having a route destination; obtain an identification of an unfavorable condition for the first route; and responsive to the obtained identification of the unfavorable condition, identify a temporary route, the temporary route comprising a loop between a first location and a second location. The system further includes an AV control system of the AV to: cause the AV to follow the temporary route for a period of time; and make a determination to direct the AV to one of i) the first route or ii) a second route to the route destination.

In another implementation, disclosed is a non-transitory computer-readable memory configured to store instructions that, when executed by a processing device a data processing system of an autonomous vehicle (AV), are to cause the processing device to perform operations including: maintaining the AV on a highway, wherein the highway is a part of a first route, the first route having a route destination; obtaining an identification of an unfavorable condition for the first route; responsive to the obtained identification of the unfavorable condition, identifying a temporary route, the temporary route comprising a loop between a first location and a second location; using an AV control system of the AV to cause the AV to follow the temporary route for a period of time; and making a determination to direct the AV to one of i) the first route or ii) a second route to the route destination.

DETAILED DESCRIPTION

Autonomously driven trucks (ADTs) are large vehicles capable of delivering one or more cargo trailers to various destinations reachable by highways, city streets, rural roads, and the like. Computer vision of ADTs is facilitated by a sensing system that can include light detection and ranging devices (lidars), radar detection and ranging devices, cameras, various positioning systems, sonars, and so on. The sensing system detects (at run time) other vehicles, pedestrians, obstacles, road signs, changing weather conditions, construction zones, and so on. Dynamic data obtained by the sensing system complements more static mapping data that maps roadways and surrounding objects along a path of an ADT. Mapping data can be very detailed and comprehensive and can inform a data processing system of the ADT about a number of lanes at various sections of the road, width of the lanes, grade (angle of incline of the road surface), type and quality of the road surface, positions of road signs, parameters of road intersections, and so on. Detailed mapping data can occupy a large memory volume and can be loaded into memory ADT for a carefully preplanned trucking mission, being tailored to a specific route to be taken by the ADT.

Road conditions, however, can be unpredictable. Roadways can become blocked, e.g., by a vehicle collision or any other type of an accident, unexpected construction, weather-related conditions, and so on. A blocked (or severely obstructed) route can be a much more significant problem for ADTs compared with driver-operated trucks or even autonomously driven passenger cars or vans. A possibility of driving in reverse for an ADT can be severely limited on a roadway populated with other vehicles. Similarly, an ADT directed (e.g., by police or construction crew) to a different route may not have sufficiently detailed mapping information for the new route to allow safe ADT operations.

Aspects and implementations of the present disclosure address these and other shortcomings of the existing technologies by enabling techniques of identifying adverse road conditions and causing an ADT to a perform a cyclic pattern of motion (herein also referred to as a waiting loop) and enable the ADT to remain in the mapped area for a certain waiting period. In one example, the ADT can perform a loop that includes exiting the highway, reentering the highway in the opposite direction, reaching one of the next highway exits, exiting the highway again, and reentering the highway in the initial direction. The time spent in the waiting loop can be used to achieve one of the following objectives: waiting for a favorable resolution of the adverse condition, mapping a new route and downloading (e.g., from a control center) a corresponding mapping information for continuing the trucking mission on the new route, communicating to the control center a request for a live technical assistance and waiting for the assistance to arrive, and the like. The advantages of the disclosed implementations include, but are not limited to, improved safety and efficiency of trucking operations by avoiding driving under unfavorable road conditions, weather- or traffic-related.

FIG. 1A is a diagram illustrating components of an example autonomous vehicle, such as an autonomously driven truck 100, that uses sensing and perception technology to support autonomous driving operations, in accordance with some implementations of the present disclosure. Although subsequent references are made to autonomously driven trucks (ADT), aspects and implementations of the present disclosure should be understood to apply to other autonomous motorized vehicles, such as cars, buses, motorcycles, all-terrain vehicles, recreational vehicles, any specialized farming or construction vehicles, sidewalk delivery robotic vehicles, and the like, or any other vehicles capable of being operated in a autonomously driven mode (without a human input or with a reduced human input).

For brevity and conciseness, various systems and methods are described below in conjunction with autonomous vehicles, but similar techniques can be used in various driver assistance systems that do not rise to the level of fully autonomous driving systems. More specifically, disclosed techniques can be used in Society of Automotive Engineers (SAE) Level 2 driver assistance systems that implement steering, braking, acceleration, lane centering, adaptive cruise control, etc., as well as other driver support. The disclosed techniques can be used in SAE Level 3 driving assistance systems capable of autonomous driving under limited (e.g., highway) conditions. Likewise, the disclosed techniques can be used in vehicles that use SAE Level 4 self-driving systems that operate autonomously under most regular driving situations and require only occasional attention of the human operator. In such systems, techniques for addressing unfavorable driving conditions can be used automatically without a driver input or with a reduced driver control and result in improved overall safety and efficiency of autonomous, semi-autonomous, and driver assistance systems.

A driving environment 110 can include any objects (animated or non-animated) located outside the ADT, such as roadways, buildings, trees, bushes, sidewalks, bridges, mountains, other vehicles, pedestrians, and so on. The driving environment 110 can be urban, suburban, rural, highway and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the autonomous vehicle, from close distances of several feet (or less) to several miles (or more).

The example ADT 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye, the UV range, the infrared range, the radio frequency range, etc.

The sensing system 120 can include a radar unit 126, which can be any system that utilizes radio or microwave frequency signals to sense objects within driving environment 110 of ADT 100. The radar unit 126 can be configured to sense both the spatial locations of the objects (including their spatial dimensions) and their velocities (e.g., using the Doppler shift technology).

The sensing system 120 can include one or more LiDAR sensors 122 (e.g., LiDAR rangefinders), which can be a laser-based unit capable of determining distances to the objects in driving environment 110, e.g., using time-of-flight (ToF) technology. The LiDAR sensor(s) 122 can utilize wavelengths of electromagnetic waves that are shorter than the wavelengths of the radio waves and can, therefore, provide a higher spatial resolution and sensitivity compared with the radar unit 126. The LiDAR sensor(s) 122 can include a coherent LiDAR sensor, such as a frequency-modulated continuous-wave (FMCW) LiDAR sensor. The LiDAR sensor(s) 122 can use optical heterodyne detection for velocity determination. In some implementations, the functionality of a ToF and coherent LiDAR sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple LiDAR sensor(s) 122 can be mounted on ADT, e.g., at different locations separated in space, to provide additional information about transverse components of the velocity of the reflecting object.

LiDAR sensor(s) 122 can include one or more laser sources producing and emitting signals and one or more detectors of the signals reflected back from the objects. LiDAR sensor(s) 122 can include spectral filters to filter out spurious electromagnetic waves having wavelengths (frequencies) that are different from the wavelengths (frequencies) of the emitted signals. In some implementations, LiDAR sensor(s) 122 can include directional filters (e.g., apertures, diffraction gratings, and so on) to filter out electromagnetic waves that can arrive at the detectors along directions different from the directions of the emitted signals. LiDAR sensor(s) 122 can use various other optical components (lenses, mirrors, gratings, optical films, interferometers, spectrometers, local oscillators, and the like) to enhance sensing capabilities of the sensors.

In some implementations, LiDAR sensor(s) 122 can scan a full 360-degree view within a horizontal plane. In some implementations, LiDAR sensor 122 can be capable of spatial scanning along both the horizontal and vertical directions. In some implementations, the field of view can be up to 90 degrees in the vertical direction (e.g., with at least a part of the region above the horizon being scanned by the LiDAR signals). In some implementations, the field of view can be a full hemisphere. For brevity and conciseness, when a reference to "LiDAR technology," "LiDAR sensing," "LiDAR data," and "LiDAR," in general, is made in the present disclosure, such a reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of ADT 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the LiDAR sensing data (coherent Doppler data and incoherent ToF data) to determine distances to various objects in the environment 110 and velocities (radial and, in some implementations, transverse) of such objects. In some implementations, the perception system 132 can use the LiDAR data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the LiDAR data, the perception system 132 can determine the distance from the rock to the ADT and, therefore, by combining the distance information with the angular size of the rock, the perception system 132 can determine the linear dimensions of the rock as well.

In another implementation, using the LiDAR data, the perception system 132 can determine how far a detected object is from the ADT and can further determine the component of the object's velocity along the direction of the ADT's motion. Furthermore, using a series of quick images obtained by the camera, the perception system 132 can also determine the lateral velocity of the detected object in a direction perpendicular to the direction of the ADT's motion. In some implementations, the lateral velocity can be determined from the LiDAR data alone, for example, by recognizing an edge of the object (using horizontal scanning) and further determining how quickly the edge of the object is moving in the lateral direction. Each of the sensor frames can include multiple points. Each point can correspond to a reflecting surface from which a signal emitted by the sensing system 120 (e.g., by LiDAR sensor(s) 122, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the LiDAR data whereas the angles can be independently known from a synchronizer data, a clock data, e.g., based on the known scanning frequency within the horizontal plane.

The perception system 132 can further receive information from a GPS transceiver (not shown) configured to obtain information about the position of the ADT relative to Earth. The GPS data processing module 134 can use the GPS data in conjunction with the sensing data to help accurately determine location of the ADT with respect to fixed objects of the driving environment 110, such as roadways, lane boundaries, intersections, sidewalks, crosswalks, road signs, surrounding buildings, and so on, locations of which can be provided by map information 135. In some implementations, other (than GPS) measurement units (e.g., inertial measurement units, speedometers, accelerometers, etc.) can also be used (alone or in conjunction with GPS) for identification of locations of the ADT relative to Earth. Additional tools to enable identification of locations can include various mapping algorithms based on data obtained by the perception system 132, which can be used (together with or separately from) map info 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include a driving trajectory control module (DTCM) 133 to implement waiting loop and blind spot mitigation, as described in more detail below. The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the ADT relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136 can be used by an autonomous driving system, such as autonomous vehicle control system (AVCS) 140. The AVCS 140 can include one or more algorithms that control how the ADT is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the ADT. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain 150, brakes 152, steering 154 vehicle electronics 160, suspension 156, signaling 170, and other systems and components not explicitly shown in FIG. 1A. The powertrain 150 can include an engine (internal combustion engine, electric engine, and so on), transmission, differentials, axles, and wheels. The vehicle electronics 160 can include an on-board computer, engine management, ignition, communication systems, carputers, telematics, in-car entertainment systems, and other systems and components. The signaling 170 can include high and low headlights, stopping lights, turning and backing lights, marker lights and other lights used to signal to other road users as well as horns and alarms, inside lighting system, dashboard notification system, passenger notification system, radio and wireless network transmission systems, and so on. In some implementations, signaling 170 can include automated emergency signaling (AES) 172 to implement enhanced illumination of stranded vehicles and deployment of warning devices, as described in more detail below. Some of the instructions output by the AVCS 140 can be delivered directly to the powertrain 150, brakes 152, steering 154, signaling 170, etc., whereas other instructions output by the AVCS 140 are first delivered to the vehicle electronics 160, which generate commands to the other components of the vehicle.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain 150, brakes 152, and steering 154 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain 150, brakes 152, and steering 154 to resume the previous speed settings of the vehicle.

Figure 1B:
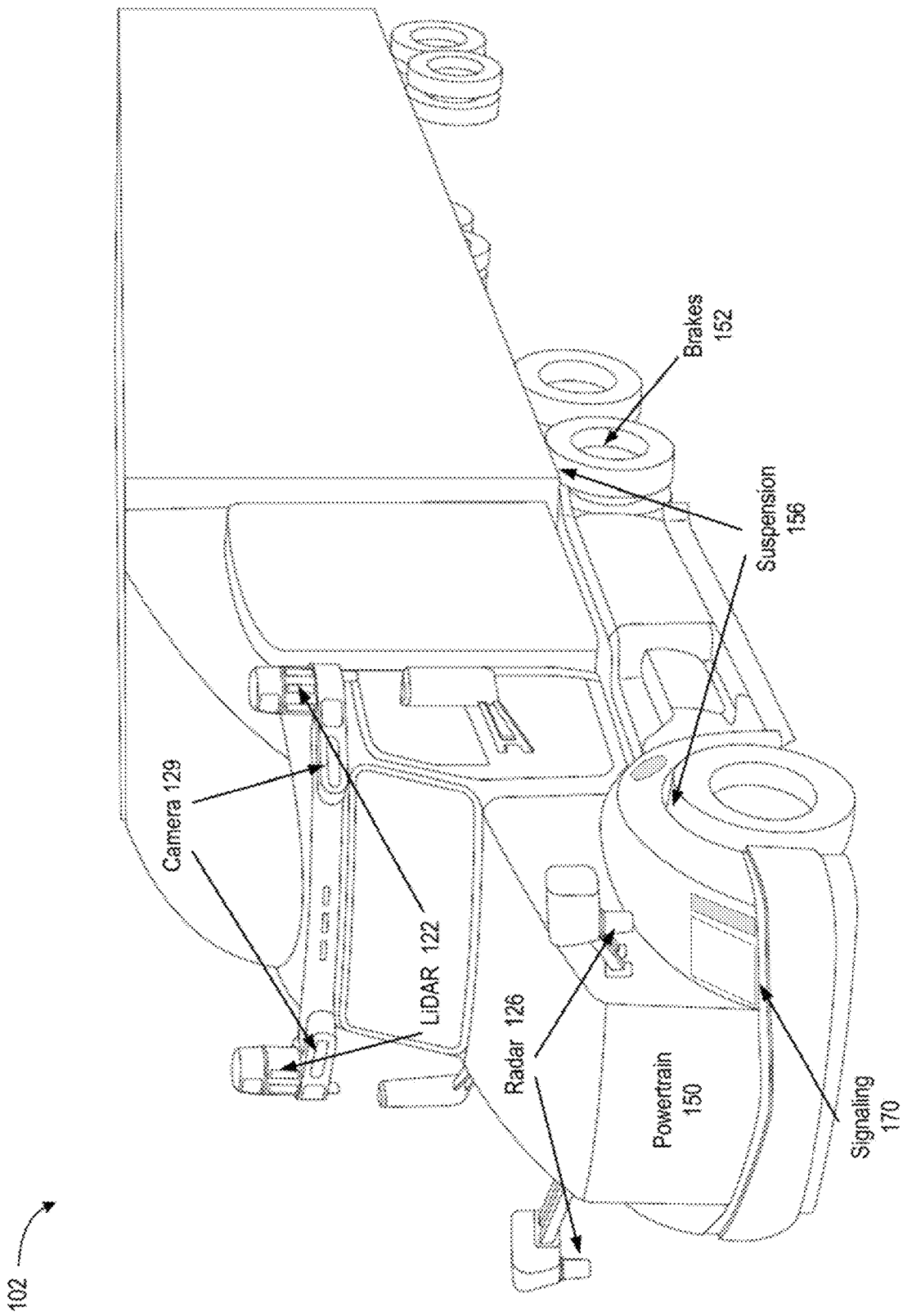
FIG. 1B is a schematic depiction of an autonomously driven truck capable of performing one or more described techniques, in accordance with implementations of the present disclosure.

FIG. 1B is a schematic depiction of an autonomously driven truck 102 capable of performing one or more described techniques, in accordance with implementations of the present disclosure. Depicted schematically are some of the systems of the autonomously driven truck 102, such as lidar(s) 122, radar(s) 126, camera(s) 129, powertrain 150, brakes 152, suspension 156, signaling 170. Numerous other systems are not indicated, for conciseness.

Figure 2A:
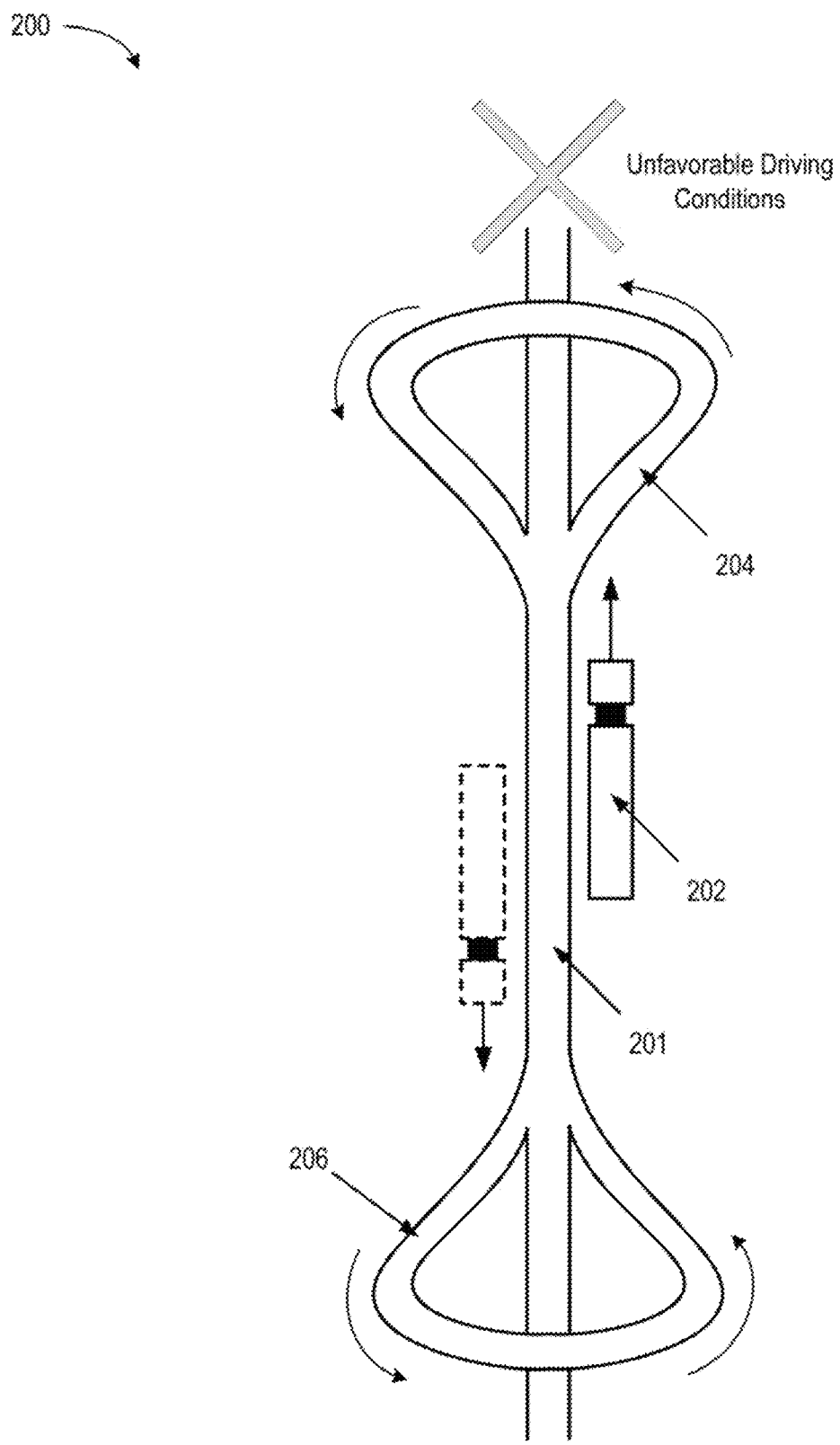
FIG. 2A is a schematic depiction of a waiting loop for autonomously driven trucks encountering unfavorable driving conditions, in accordance with some implementations of the present disclosure.

FIG. 2A is a schematic depiction of a waiting loop 200 for autonomously driven trucks encountering unfavorable driving conditions, in accordance with some implementations of the present disclosure. In some situations, autonomously driven vehicles, and trucks in particular, can encounter situations where further progression along the programmed driving mission becomes temporarily undesirable. For example, a traffic blockage can occur ahead, or heavy rain/ice/snow can be encountered or is expected to be encountered along the route, or any other condition can occur that is outside a regulatory or operational design domain for autonomously driven vehicles. At the same time, ADT may not have an alternative driving mission mapped readily available. Moreover, parking an ADT on the side of the road may likewise be a sub-optimal solution, as parking can be unavailable, forbidden, too risky, or a potential parking area can lack detailed mapping required for safe parking of ADT.

Waiting loop 200 addresses such and other driving situations by enabling ADT to remain on or near the current driving mission for a period of time, until the problematic driving situation is resolved and/or the driving conditions improve. As depicted in FIG. 2A, when the data processing system 130 of ADT 202 determines that unfavorable driving conditions are expected, e.g., ahead on a highway 201, the driving trajectory control module (DTCM) 133 of the data processing system 130 can make a decision to begin execution of a waiting loop. In some implementations, the decision to begin execution of the waiting loop can be made by an outside entity, such as a command center (e.g., a server coordinating progression of ADT 202, as well as, potentially, other vehicles), which is then communicated to the data processing system 130 of ADT 202. During execution of the waiting loop, ADT 202 can take the next exit 204 (or a subsequent exit, or one of the next exits), turn around and continue to drive in the opposite direction until another exit 206 (which can be the earliest exit encountered in the opposite direction or one of subsequent exits) is reached. At exit 206, ADT 202 can safely make another U-turn and continue towards the first exit 204 to complete the waiting loop 200. Waiting loop 200 can then be repeated multiple times, as needed, to wait for a favorable resolution of the problematic road conditions or other intervening events. In some implementations, the waiting loop performed within each cycle of loop driving (forward and backward) can be the same loop. In some implementations, one or more of the exits 204 and/or 206 can be varied between different loop cycles, so that the geometry of the waiting loop changes for at least some of the loop cycles.

Although it is depicted in FIG. 2A, for conciseness, that ADT 202 uses the same exit 204 to leave the road and then to return to highway 201 (in the opposite direction of travel), ADT 202 can use any exit of any other topology, which may include any number of intervening roads that take ADT 202 back to highway 201. Similarly, exit 206 can have any possible topology. Waiting loop 200 can include travel over an arbitrary number of roads, any of which can be interstate roads, highways, local roads, paved roads, unpaved roads, and so on. While ADT 202 remains on waiting loop 200, conditions can improve. For example, the traffic blockage can be resolved (or a detour can be lifted) and the normal flow of traffic can be restored. Weather conditions can likewise improve (e.g., precipitation can cease) and/or road-cleaning vehicles can clear the unfavorable section of the road that lies ahead. In some implementations, during execution of a waiting loop, DTCM 133 can map a new driving route that avoids driving under unfavorable conditions and can instruct the AVCS 140 to direct ADT 202 to the new mapped route. In some implementations, DTCM 133 can request outside help in resolving the problematic situation. For example, a server (e.g., a command center) providing online support to ADT 202 (and other vehicles) can map a new driving route and provide it to DTCM 133 for implementation. Having obtained, developed, or successfully waited for a resolution to the current problematic situation, DTCM 133 can direct ADT 202 to depart from waiting loop 200.

In some implementations, DTCM 133 can evaluate the increased risk of proceeding through unfavorable driving conditions (e.g., driving through rain), parking on the side of the highway, parking away from the highway, etc., against the cost of executing a waiting loop (which, being a normal driving behavior, can be associated with a lower risk). Periodically, or as new sensing data (or data from the command center) becomes available, DTCM 133 can reevaluate the decision to execute the waiting loop. While evaluating (or reevaluating) the decision to execute (or continue to execute) the waiting loop, DTCM 133 can consider whether ADT 202 can still reach the final destination in time, whether ADT 202 needs to be additionally refueled along the way or if ADT 202 is to stop at some point before the destination anyway. If it is determined that ADT 202 is to require a human help, the time spent by ADT 202 in the waiting loop can be used to send the rescue team near the location where the waiting loop is being executed (or at some other location), so that the rescue team can arrive before ADT 202 runs out of fuel.

Figure 2B:
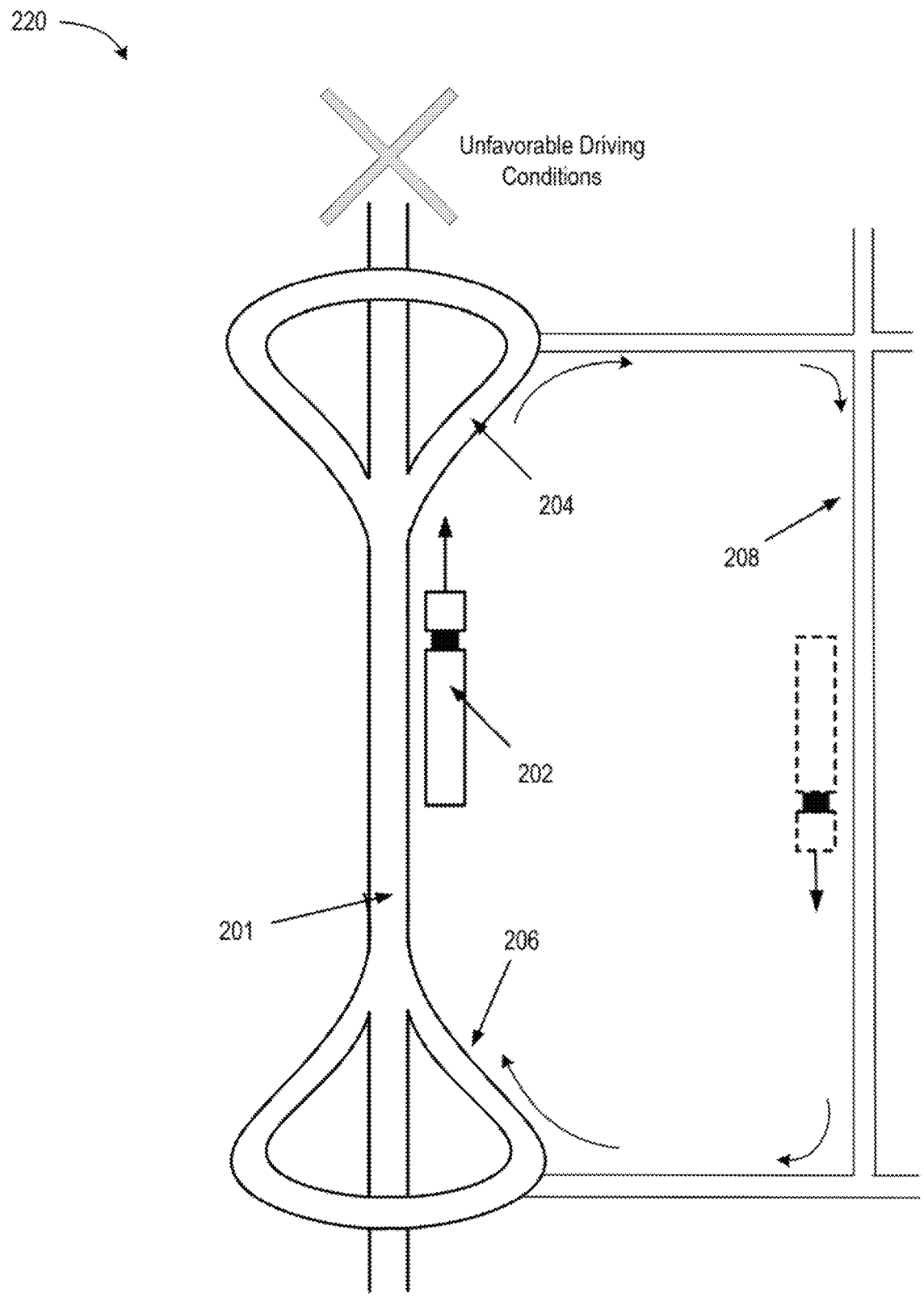
FIG. 2B is a schematic depiction of another example waiting loop that uses a local road for at least a part of the loop, in accordance with some implementations of the present disclosure.

FIG. 2B is a schematic depiction of another example waiting loop 220 that uses a local road for at least a part of the loop, in accordance with some implementations of the present disclosure. For example, the waiting loop can include taking an exit (e.g., exit 204), driving along a different road (or multiple connected roads), e.g., local road 208, on one or more streets, entering the highway at another point (e.g., exit 206), and then leaving the highway again at another exit, which can be the same as (or different than) exit 204. As a result, ADT 202 can avoid travelling on the opposite side of the same highway 201.

Figure 2C:
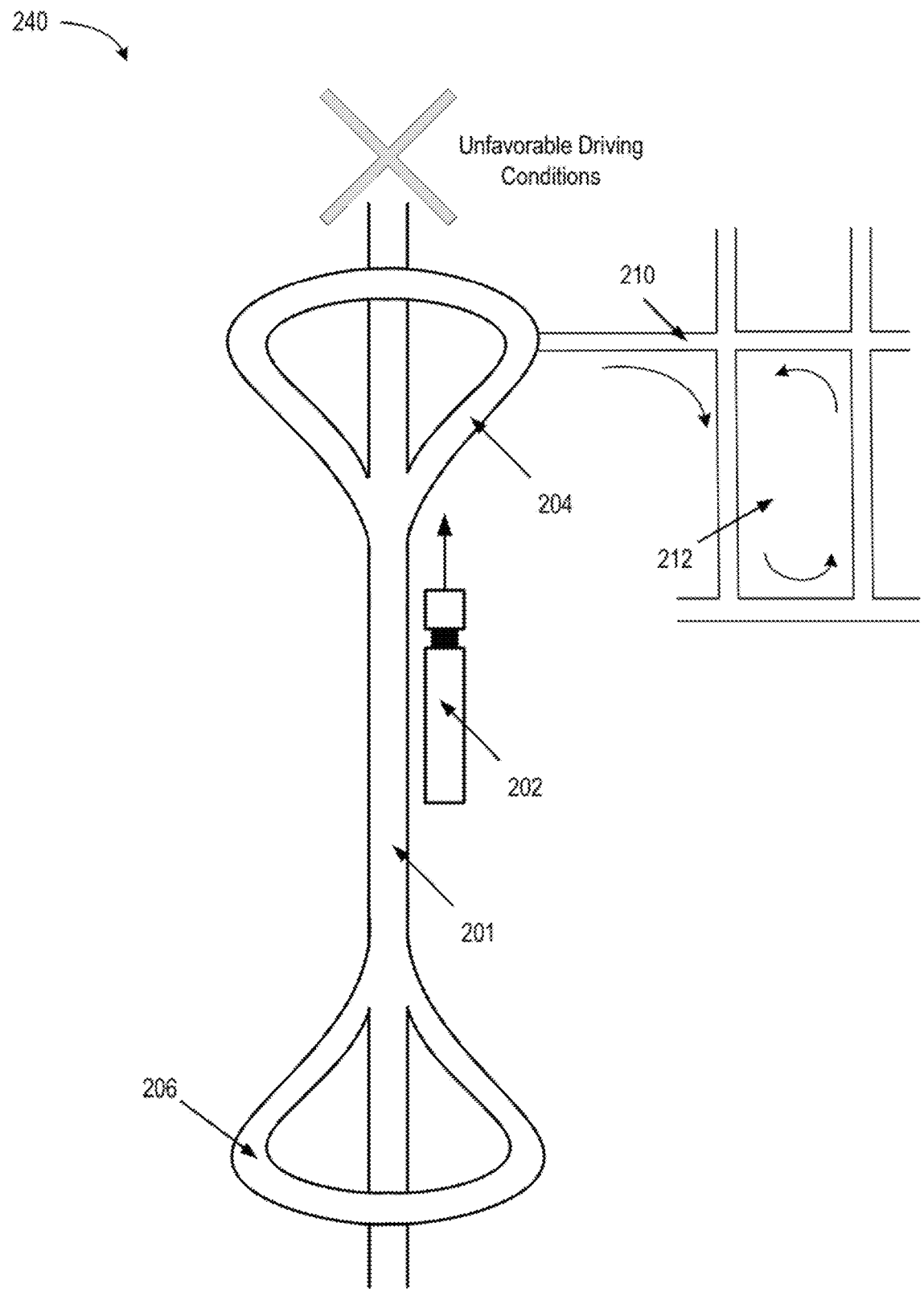
FIG. 2C is a schematic depiction of another example waiting loop performed away from the highway, in accordance with some implementations of the present disclosure.

FIG. 2C is a schematic depiction of another example waiting loop 240 performed away from the highway, in accordance with some implementations of the present disclosure. As illustrated, ADT 202 can take an exit (e.g., exit 204) and follow a side road 210 to a loop of local roads 212 (which can be or include one or more city streets). At the completion of the waiting loop, ADT 202 can return to highway 201 using the same (exit 204) or a different exit.

In some implementations, any two consecutive cycles of the waiting loop can share all, some, or no common driving surfaces. For example, one cycle can be performed between exits 204 and 206 of waiting loop 200 of FIG. 2A, another cycle can be performed using waiting loop 220 of FIG. 2B, yet another cycle can be performed using waiting loop 240 of FIG. 2C. Numerous other waiting loops (and combinations thereof) different from the waiting loops depicted in FIGS. 2A-C are also within the scope of the present disclosure.

In some instances, an adverse driving condition may not resolve (or an assistance may not arrive) while ADT 202 is executing a waiting loop. In some instances, the ADT can run out of fuel. In other instances, various other roads (including highway 201 in the opposite direction of travel) can also be blocked or experiencing unfavorable driving conditions. In such situations, ADT 202 can execute emergency parking and mark its presence on the road (highway or any other road) using techniques described below in conjunction with FIG. 3 and FIGS. 4A-B.

Figure 3:
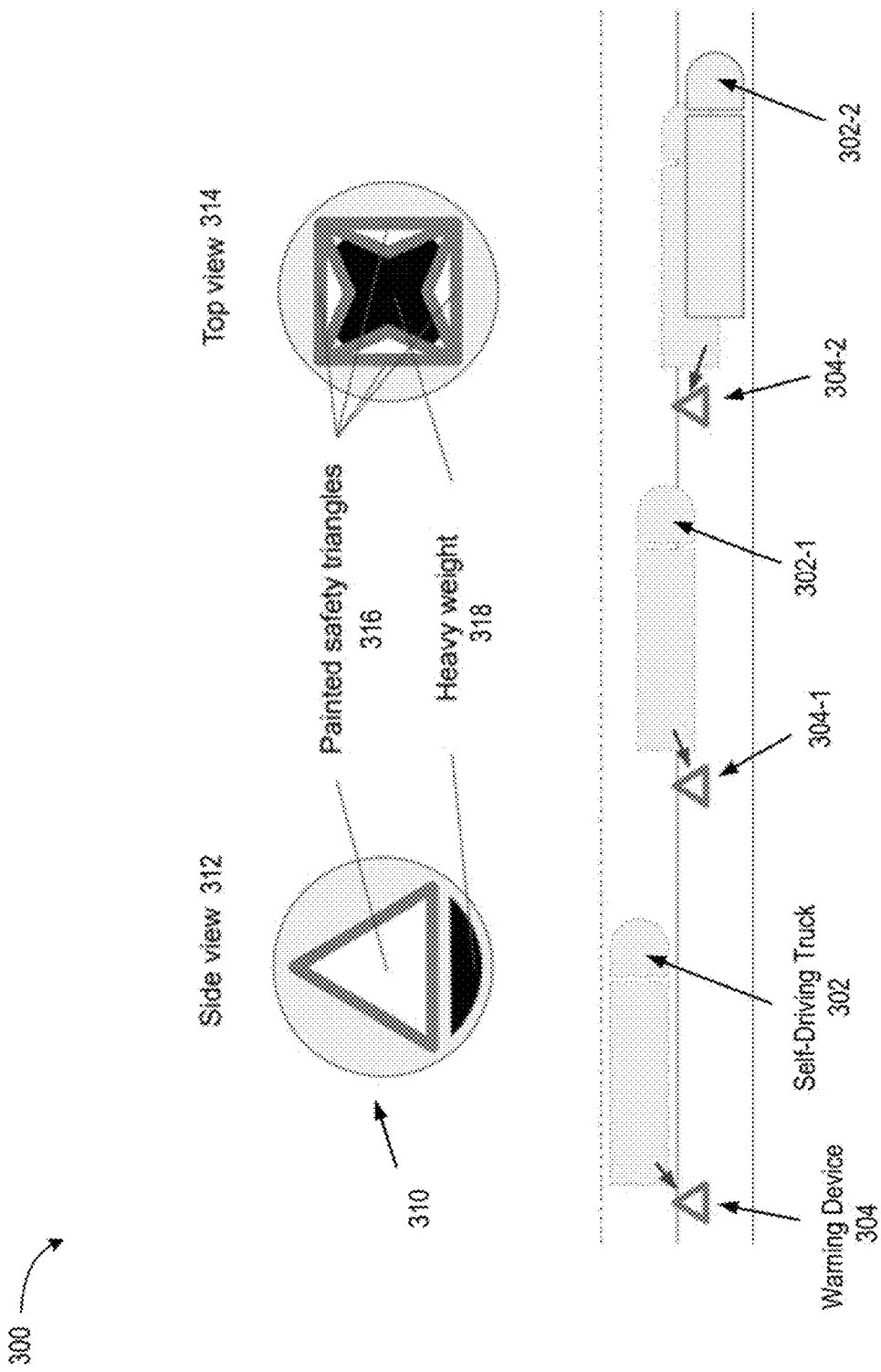
FIG. 3 is a schematic depiction of a process of automated placement of warning devices by a stopping and then stopped autonomously driven truck, in accordance with some implementations of the present disclosure.

FIG. 3 is a schematic depiction of a process 300 of automated placement of warning devices by a stopping and then stopped autonomously driven truck, in accordance with some implementations of the present disclosure. An autonomously driven commercial vehicle, e.g., ADT 302, can be required to be marked with warning devices (also known as warning triangles, safety triangles, emergency devices, and so on) when the vehicle is stranded or stopped on the shoulder (or within a lane) of the road, to warn other vehicle of the vehicle's presence. Typically, the vehicle is required to be marked with at least one warning device placed behind the vehicle (e.g., at a distance of about 100 feet) on a divided highway and, additionally, at least one warning device placed ahead of the vehicle on an undivided highway. Autonomous vehicles lack human assistance that would ensure a timely placement of the warning devices (often, the warning devices have to be placed expeditiously, e.g., within 10 minutes from stopping).

Implementations of the instant disclosure describe methods of placement of warning devices behind a stopping vehicle using the inertia of the motion of the vehicle. Depicted in FIG. 3 is ADT 302 that has made a decision to stop on the shoulder of a divided highway. The decision can be a result of a mechanical issue (e.g., a blown tire or a failed component of the vehicle), a safety issue (a displaced cargo), a weather issue (heavy snow and/or ice on the road ahead), a traffic issue (accident or road closure), and the like. Having made the decision to move to the shoulder of the road, the AVCS 140 can begin deployment of a warning device 304 by releasing warning device 304 to the road (e.g. by opening a gate of the warning device repository). The deployed (e.g., released, dropped, pushed, etc.) warning device 304 can continue to move forward with a decreasing speed (e.g., as a result of friction from the road surface). Accordingly, as ADT 302 decelerates (position 302-1) and eventually comes to a full stop (as depicted with position of ADT 302-2), the warning device follows ADT (position 304-1) and comes to a stop (as depicted with position of ADT 304-2) at approximately the correct distance behind ADT.

In some implementations, warning device 304 can be capable of rolling on the road surface, e.g., can be of a spheroidal form (though not necessarily of a perfect spherical form) or a cylindrical form, etc., to facilitate rolling over the road surface. In some implementations, the surface of warning device 304 can intentionally be made rough, to facilitate higher friction with the road and, consequently, faster stopping of warning device 304. In some implementations, warning device 304 can be deployed from the back of the trailer, to prevent warning device 304 from being run over by the wheels of ADT 302. In some implementations, warning device 304 can be deployed from the back of the tractor but be made of such a material that is capable of restoring its shape after being run over. For example, warning device 304 can be made of a foam-like material, or any other material capable of restoring shape after a substantial deformation. To increase the likelihood of a correct placement of warning devices, multiple warning devices 304 can be deployed at the same time or one after another, e.g., at spaced time intervals.

Deployment of warning device(s) 304 can be controlled by automated emergency signaling (AES) 172 module of the signaling 170 of ADT 302. In some implementations, AES 172 can be implemented as part of the AVCS 140 or as a separate module (communicatively coupled to the AVCS 140) that can be mounted on the trailer of ADT rather than on the tractor (for more precise and fast placement of warding devices). Once the AVCS 140 has made a decision to stop ADT 302, AVCS 140 can output corresponding instructions to powertrain 150 (to reduce rpm and to begin gear downshifting), to brakes 152 (to start braking), and to steering 154 (to move ADT 302 over to the shoulder of the road). Moreover, AVCS 140 can output instructions to the signaling 170 to turn on turning lights, emergency flashing lights, stopping lights, and so on. AVCS 140 can also instruct AES 172 to begin deployment of warning device(s) 304. Additionally, AVCS 140 can provide AES 173 with an anticipated deceleration schedule (e.g., averaged expected deceleration, time of stopping, distance to full stop, and so on). Based on the received deceleration schedule, AES 173 can deploy warning device(s) 304 immediately or after a calculated time delay, e.g., to ensure that warning device(s) 304 are not placed too far behind the stopped ADT 302-2.

Sensing system 120 can detect motion of deployed warning device(s) 304, and data processing system 130 can provide the AVCS 140 with tracking information for the deployed warning device(s) 304. Based on the provided tracking information, the AVCS 140 can change deceleration schedule to ensure that deployed warning device(s) 304 come to stop within an acceptable range (e.g., 10 feet, 20 feet, etc.) around a target distance (e.g., 100 feet, 50 meters, etc.) from the stopped ADT 302-2. For example, if the estimated stopping position 304-1 of the warning device is outside the acceptable range, e.g., too close to an estimated stopped ADT position, the AVCS 140 can change the deceleration schedule by releasing brakes to adjust position of the stopped ADT 302-2. Similarly, if the estimated stopping position 304-1 of the warning device is outside the acceptable range and too far behind ADT 302-2, the AVCS 140 can change the deceleration schedule by braking harder. In some implementations, after both ADT 302-2 and the warning device 304-2 have come to a stop, and it is determined by the data processing system 130 that the warning device 304-2 is too far behind, ADT 302-2 can choose a period of time when traffic is light or absent, and back up towards the warning device 304-2 until the target distance is achieved.

In some implementations, AES 172 can deploy multiple warning device(s) 304 at two (or more) different instances of time with the warning device(s) deployed at a first instance of time intended to serve as forward warning devices (placed head of the stopped ADT) and the warning device(s) deployed at a later, second, instance of time to be served as rear waring devices (placed behind the stopped ADT). More specifically, once both the first and the second warning device(s) have come to a stop, ADT 302 can wait for a period of light traffic or no traffic and back up into a position between the two warning devices (or between two sets of warning devices, if multiple devices were deployed at each instance of time). The forward warning device(s) can be made of a deformable material, in case ADT 302 has to ride over the forward devices.

One illustrative non-limiting example of a warning device 310 is shown in FIG. 3. Depicted is a spherical (or spheroidal) warning device 310 with safety content (e.g., safety triangles 316) painted (or affixed) thereon, as depicted by the side view 312. Multiple instances of safety content can be painted (or affixed) to the warning device 310, for improved visibility. The depicted symbols can be of reflective material or paint to further improve visibility especially at night. As a result, notwithstanding the final orientation of the stopped warning device 310, safety content can be visible to vehicle traffic. For example, as depicted in the top view 314 of the warning device 310, four safety triangles are painted on (or affixed to) warning device 310 (although any other number is possible, too—e.g., three, five, etc.). Warning device 310 can have an asymmetric weight distribution to ensure a desired orientation of the stopped warning device. In the depicted example, a weight 318 can (optionally) be added to the bottom of warning device 310 to ensure that warning device 310 comes to a stop with the vertices of safety triangles pointing up.

Figure 4A:
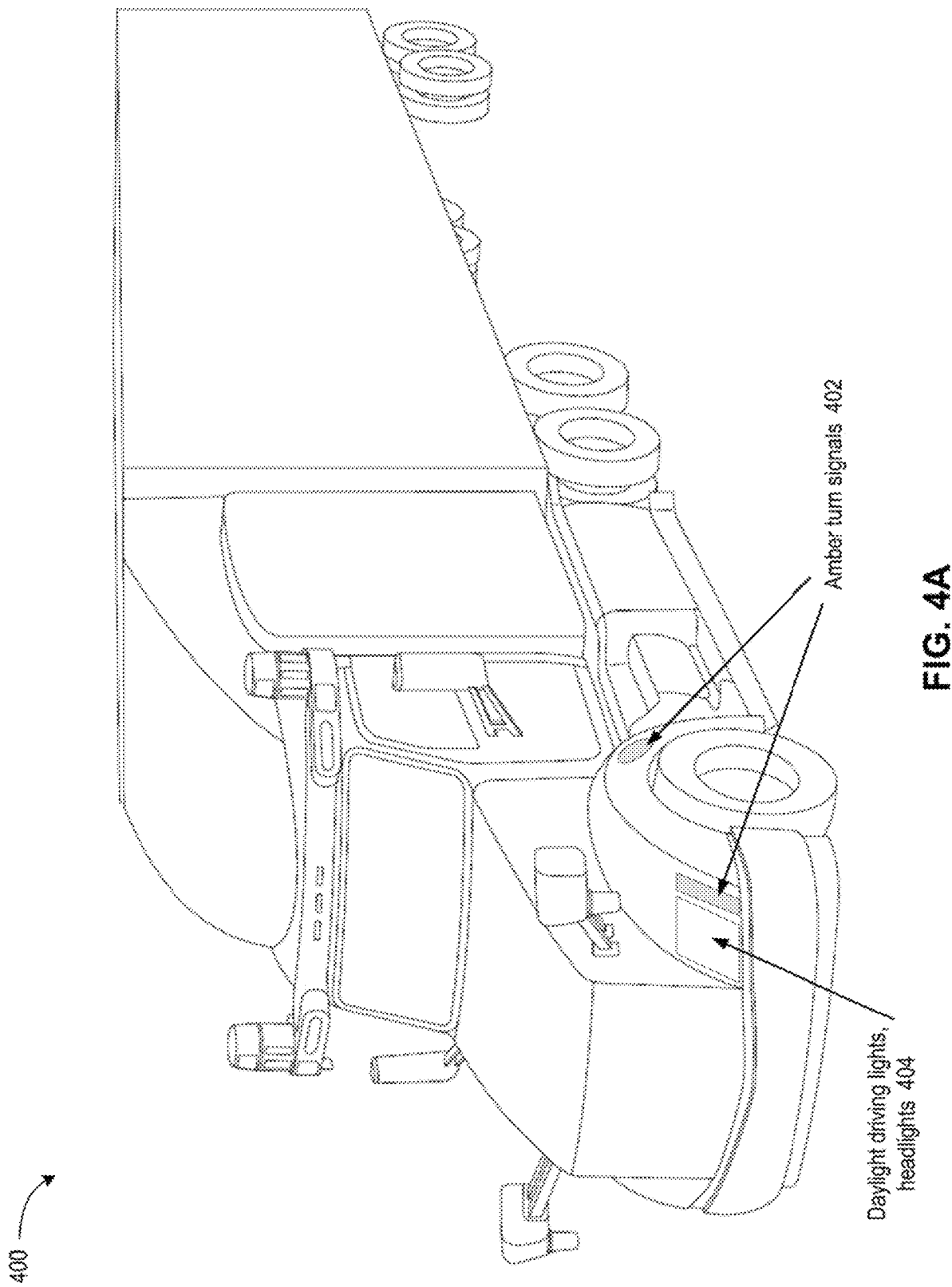
FIGS. 4A-B illustrate positioning of lighting devices for enhanced illumination of stranded and stopped autonomously driven trucks, in accordance with some implementations of the present disclosure.
Figure 4B:
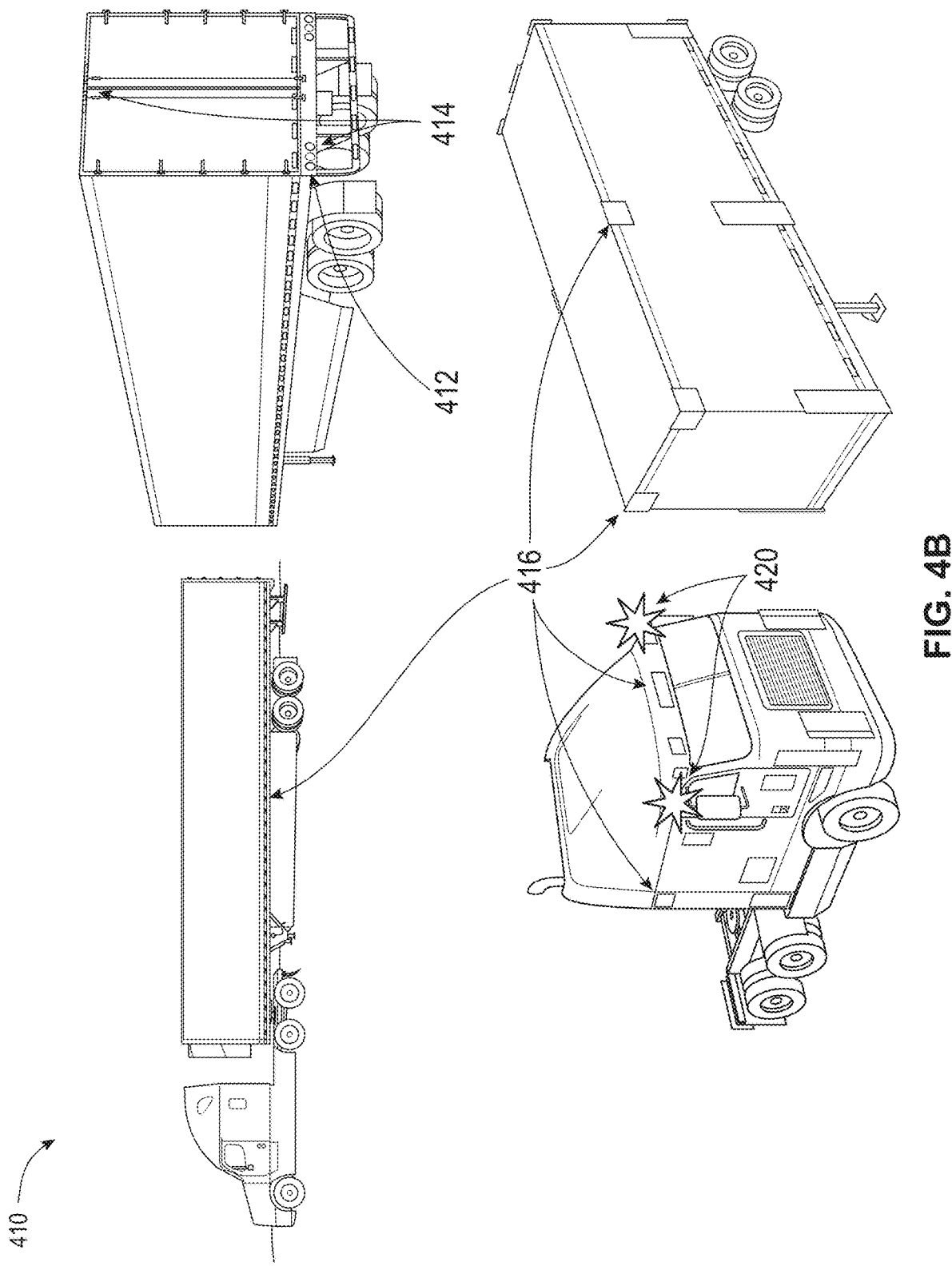

FIGS. 4A-B illustrate positioning of lighting devices for enhanced illumination of stranded and stopped autonomous driving trucks, in accordance with some implementations of the present disclosure. Instead of (or in addition to) placing warning devices ahead and/or behind a stranded or stopped vehicle, implementations of the present disclosure identify methods of using illumination devices already available on ADTs (as well as additional illuminations devices) for marking ADT and identification of stopped ADT to other traffic participants. Existing illumination devices can include, with reference to FIG. 4A, amber turn signals 402, daylight driving lights/headlights 404, emergency lights (not identified in FIG. 4A). Existing illumination devices can further include, with reference to FIG. 4B, red turn signals 412, (lower and upper) red tail lights 414, amber marking lights 416, and other lights (not shown).

Presently, steady lights (with the exception of blinking emergency lights) are used for stopped or stranded vehicles. However, people tend to respond more attentively to flashing lights rather than to steady lights (which are often used to identify construction vehicles). Disclosed implementations use some or all of the following: driving lights/headlights 404, red turn signals 412, red tail lights 414, amber marking lights 416, and so on. Different flashing patterns can be used, e.g., 2 seconds on followed by 2 seconds off, or any other flashing pattern, such as S-O-S pattern (three shorts signals followed by three long signals followed by three more shorts signals). Different lights can be flashed using different patterns. For example, red turn signals 412 and red tail lights 414 can be flashed (on-off) every 2 seconds whereas amber marking lights 416 can be flashed every 1 second. In some implementations, some of the amber marking lights 416 can be flashed differently than other amber marking lights. For example, amber marking lights located on the tractor can be flashed differently than amber marking lights located on the trailer. Likewise, amber marking lights located near the middle of the trailer can be flashed differently than amber marking lights located near the ends of the trailer. Amber marking lights located near the bottom of the tractor can be flashed differently than the lights located near the top of the tractor, and so on.

In some implementations, additional high luminance lights 420 (e.g., amber lights or lights of any other color) can be placed at locations that enable enhanced visibility to outside vehicles. Such enhanced visibility can be achieved, for example, by placing high luminance lights 420 on top of sensors of the sensing system 120, which can be located on top (or in place) of rear view (side) mirrors. Such a location of high luminance lights 420 can be advantageous by providing an efficient combination of a reasonably high elevation (only somewhat lower than the top of the cabin) and a laterally-extended position that is minimally obscured by the sides of the trailer and, therefore, is highly visible from large distances. The additional high luminance lights 420 can also be used in the flashing mode with a flashing pattern that is similar or different from the flashing patterns of other lights. In some implementations, high luminance lights 420 can be rotating instead of flashing. Various types of light sources can be used in high luminance lights 420, e.g. halogen bulbs, light-emitting diodes, or any other types of lights sources.

In some implementations, high luminance lights 420 can be directed outwards, toward the oncoming traffic. In some implementations, high luminance lights 420 can be directed (partially or fully) inwards, towards the sides of the trailer. On one hand, such an inwards direction of light can prevent blinding of drivers of other vehicles. On the other hand, directing high luminance lights 420 can result (especially, coupled with the flashing character of the lights) in a strong illumination of the sides of the trailer visible to drivers of other vehicles at significant distances from ADT.

In some implementations, patterns of flashing/steady lights in conjunction with specific types/placement/colors of lights can be used to distinguish (e.g., via eventual federal and/or state regulations) autonomously driven trucks from driver-operated vehicles.

Figure 5:
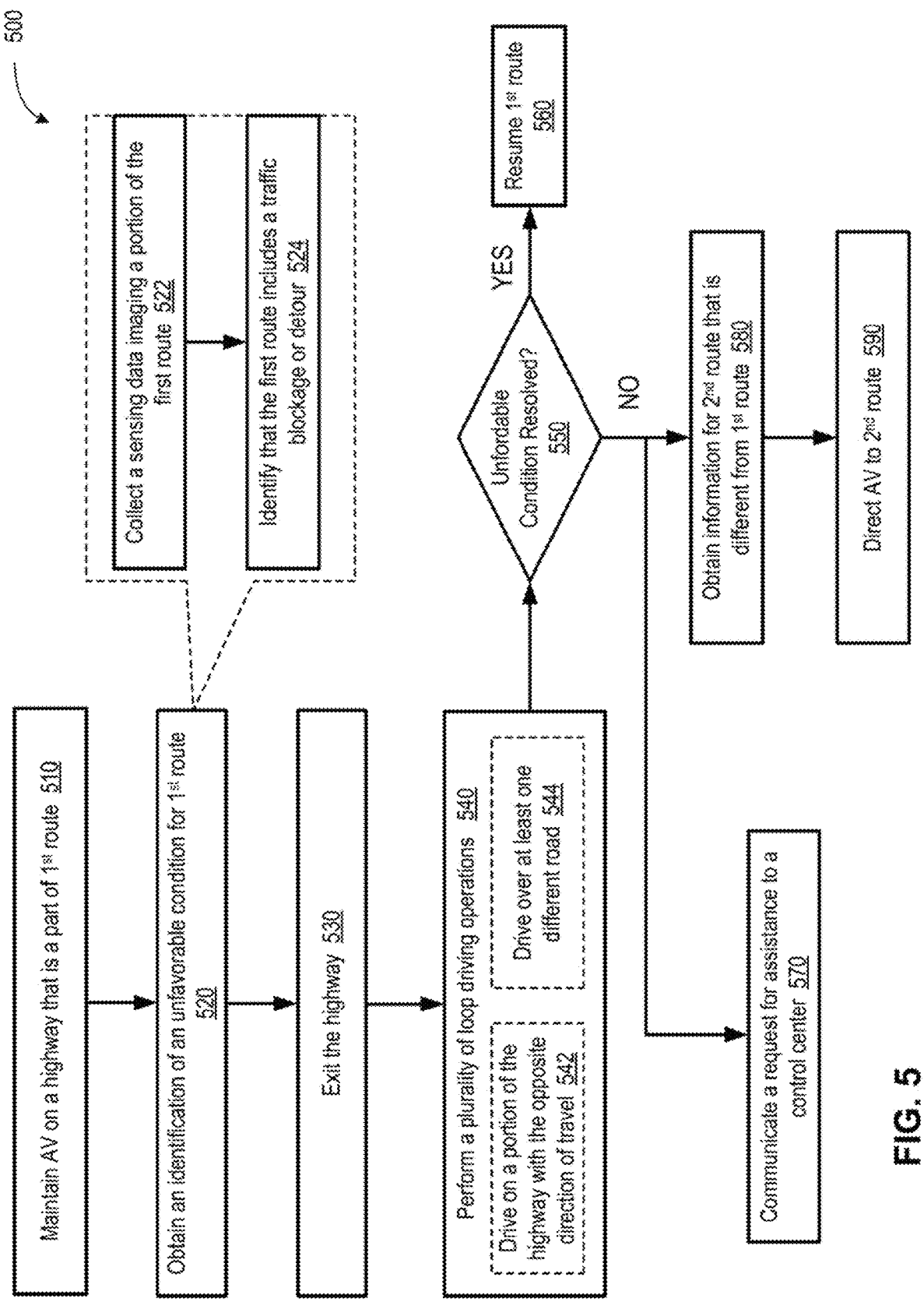
FIG. 5 depicts a flow diagram of an example method of a waiting loop execution during autonomous trucking missions by an ADT, in accordance with some implementations of the present disclosure.

FIG. 5 depicts a flow diagram of an example method 500 of a waiting loop execution during autonomous trucking missions by an ADT, in accordance with some implementations of the present disclosure. Method 500 described below, and/or each of its individual functions, routines, subroutines, or operations can be performed by a processing device, having one or more processing units (CPU) and memory devices communicatively coupled to the CPU(s). In certain implementations, various operations of method 500 can be performed using a single processing thread. Alternatively, various operations of method 500 can be performed using two or more processing threads, each thread executing one or more individual functions, routines, subroutines, or operations of the method. In an illustrative example, the processing threads implementing method 500 can be synchronized (e.g., using semaphores, critical sections, and/or other thread synchronization mechanisms). Alternatively, the processing threads implementing method 500 can be executed asynchronously with respect to each other. Various operations of method 500 can be performed in a different order compared with the order shown in FIG. 5. Some operations of the methods can be performed concurrently with other operations. Some operations can be optional.

The ADT can be ADT 100 of FIG. 1A, ADT 202 of FIG. 2, and the like. Method 500 can be used to improve safety and efficiency of autonomous trucking missions. The processing device(s) performing method 500 can execute instructions from various components of the AV, e.g., driving trajectory control module (DTCM) 133 or any other suitable component of data processing system 130. Method 500 may be performed while the AV is moving, e.g., on a highway, on a city street, while traveling on any road (e.g., a rural road), off-road, within a transfer hub, loading zone, parking area, and the like. Method 500 can include (at block 510) maintaining, by the data processing system of the AV, the AV on a highway. The data processing system can be operating in conjunction with an AV control system (e.g., AVCS 140), e.g., be communicatively coupled to the AV control system. The highway can be a part of a first route to a route destination. The first route can be identified by a control center of autonomous trucking operation. The route destination can be any warehouse, transfer hub, client delivery station, store, factory, plant, dumping site, etc.). Maintaining the AV on the highway can be associated with a first direction of travel (e.g., upward direction, as illustrated in FIGS. 2A-C).

At block 520, method 500 can continue with obtaining, by the data processing system of the AV, an identification of an unfavorable condition for the first route. The unfavorable condition can be a traffic blockage, a traffic slowdown, a traffic detour, an adverse weather condition, or a forecast of an adverse weather condition, or any combination thereof. In some implementations, the identification of the unfavorable condition can be obtained via a communication from the control center (e.g., over a radio connection). In some implementations, obtaining the identification of the unfavorable condition can be performed by the AV. For example, as illustrated with the callout portion of FIG. 5, obtaining the identification of the unfavorable condition can include collecting (at block 522) a sensing data imaging a portion of the first route. The sensing data can be obtained using a sensing system of the AV, which can include camera data, e.g., one or more images of the highway in the direction of travel of the AV. The sensing data can further include lidar data (and/or radar data) that identifies distances to various vehicles on the highway, sonar data, and so on. At block 524, identification of the unfavorable condition can further include identifying, by the data processing system of the AV and using the collected sensing data, that the first route includes at least one of the traffic blockage or the traffic detour. For example, the data processing system can process the collected camera data and/or lidar data using various object recognition techniques (e.g., machine learning techniques, including application of one or more neural networks to the collected data) and can recognize a sign "Detour Ahead", "Road Closed Ahead," "Chains Required Ahead," etc. Similarly, the data processing system can identify a scene of an accident that blocks the highway or a portion of the highway, or can detect presence of significant amount of precipitation (e.g., rain, snow, fog, etc.), ice, and so on. In some implementations, the identification of the unfavorable condition is obtained from at least one of a dispatch center (control center, etc.) or another vehicle (e.g., another vehicle that is ahead of the AV and has already experienced the unfavorable condition.

Responsive to the identification of the unfavorable condition, the processing system of the AV can cause the AV control system to perform a number of driving operations. For example, the processing system of the AV can identify a temporary route (e.g., as illustrated in FIGS. 2A-C), the temporary route can include a loop between a first location and a second location (e.g., between exit 204 and exit 206 in FIG. 2A). As indicated by block 530, such operations can include causing the AV to exit the highway at a first highway exit. It should be understood that "first" and "second" are mere identifiers and do not limit the operations of block 530 to exiting highway at the exit that is the closest to the AV. The first highway exit can be any exit that is encountered by the AV after the identification and prior to occurrence of the unfavorable driving condition (e.g., prior to the actual detour, scene of accident, etc.) or even while encountering such a condition (e.g., while already driving on ice, flooded roadway, in rain, snow, etc.). At block 540, the AV can perform a plurality of loop driving operations. The plurality of loop driving operations can be any operations that include a first set of driving operations that increase distance from the AV to the route destination, e.g., driving on highway 201 in the opposite direction (downward direction in FIG. 2A), on road 208 (FIG. 2B), on a part of a loop of local roads 212 (FIG. 2C), and so on. Similarly, the plurality of loop driving operations can include a second set of driving operations that decrease distance from the AV to the route destination, e.g., driving on highway 201 in the forward direction (up in FIG. 2A and FIG. 2B), on a part of a loop of local roads 212 (FIG. 2C), and so on. A set of operations can include any number of corresponding operations, e.g., one or more. In particular, each of the first (second) set of driving operations can have any number of operations (e.g., one, two, three, etc.) that increase (or decrease) the distance from the AV to the route destination, such that the waiting loop is performed only once, twice, thrice, or any number of times.

In some implementations, as indicated with optional block 542 and illustrated in FIG. 2A, one or more of the first set of driving operations can include returning to the highway and driving a portion of the highway in a second direction of travel, the second direction of travel being different from (e.g. opposite to) the first direction of travel. In some implementations, as indicated with optional block 544, one or more of the second set of driving operations can include driving the portion of the highway in the first direction of travel, e.g., from a second exit (e.g., exit 206) to the first exit (e.g., exit 204), as illustrated in FIG. 2A. In some implementations, one or more of the second set of driving operations can include driving over a road (e.g., road 208 in FIG. 2B), different from the highway, in a second direction of travel that is different from (e.g., opposite to) the first direction of travel. In some implementations, the plurality of driving operations can include one or more driving loops performed on roads that are different from the highway (e.g., driving over a loop of local roads 212 in FIG. 2C).

At an expiration of a predetermined time period, at a decision-making block 550, the processing system of the AV can determine that the unfavorable driving condition has resolved and can, at block 560, cause the AV to resume the first route. For example, the data processing system can process a communication from the central station that the snow from the highway ahead has been plowed, the accident has been cleared, the temporary detour has been lifted, and so on. In some implementations, while driving on the highway (e.g., between exit 206 and exit 204), the data processing system can obtain new camera data, lidar/radar data, etc., that indicates that the unfavorable condition is no longer present.

If, at decision-making block 550, the processing system of the AV has determined that the unfavorable condition has not resolved over a target time, method 500 can continue with a number of possible operations. For example, as shown in block 570, the processing system can communicate a request for assistance to the control center, e.g., for a human driver assistance. As another example, as shown in block 580, the processing system can obtain (e.g., download) rerouting data from the control center, e.g., information for a second route that is different from the first route. In some implementations, the second route can have the same destination as the first route. In some implementations, the destination can also be changed (e.g., by the control center). At block 590, method 500 can continue with the data processing system causing the AV to start travel on the second route. In some implementations, the target times (times from the start of the waiting loop before taking an action) can depend on the specific action to be taken. For example, the target time for requesting assistance can be different from the target time from rerouting of the driving mission.

Figure 6:
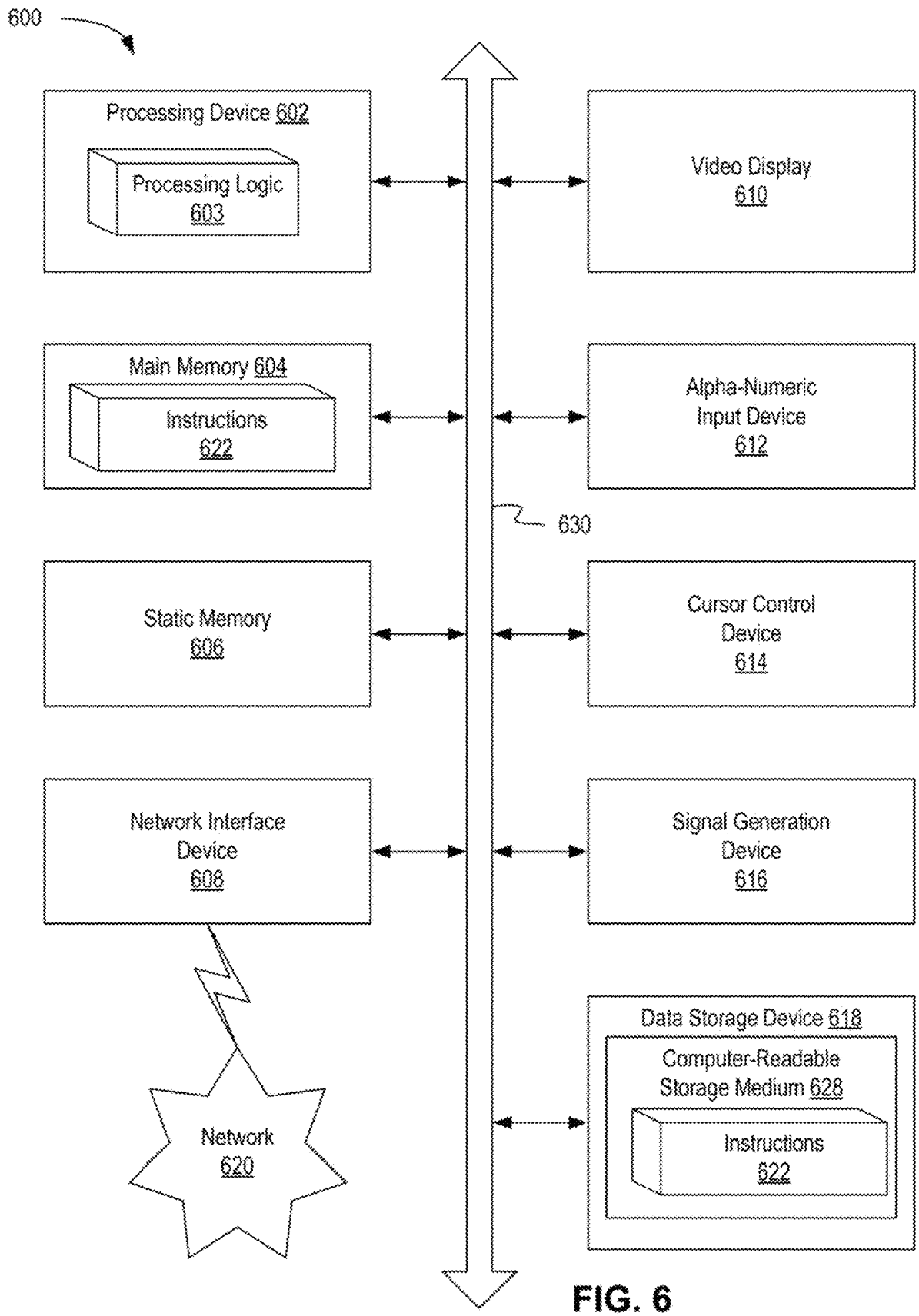
FIG. 6 depicts a block diagram of an example computer device capable of performing operations in accordance with some implementations of the present disclosure.

FIG. 6 depicts a block diagram of an example computer device 600 capable of performing operations in accordance with some implementations of the present disclosure. Example computer device 600 can be connected to other computer devices in a LAN, an intranet, an extranet, and/or the Internet. Computer device 600 can execute operations of the sensing system 120, data processing system 130, AVCS 140, or any combination thereof. Computer device 900 can execute operations of a dispatch/control center. Computer device 600 can operate in the capacity of a server in a client-server network environment. Computer device 600 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 600 can include a processing device 602 (also referred to as a processor or CPU), which can include processing logic 603, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which can communicate with each other via a bus 630.

Processing device 602 represents one or more general-purpose processing devices such as a microprocessor, central processing unit, or the like. More particularly, processing device 602 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 can be configured to execute instructions performing method 500 of a waiting loop execution during autonomous trucking missions by an ADT.

Example computer device 600 can further comprise a network interface device 608, which can be communicatively coupled to a network 620. Example computer device 600 can further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 can include a computer-readable storage medium (or, more specifically, a non-transitory computer-readable storage medium) 628 on which is stored one or more sets of executable instructions 622. In accordance with one or more aspects of the present disclosure, executable instructions 622 can comprise executable instructions performing method 500 of a waiting loop execution during autonomous trucking missions by an ADT.

Executable instructions 622 can also reside, completely or at least partially, within main memory 604 and/or within processing device 602 during execution thereof by example computer device 600, main memory 604 and processing device 602 also constituting computer-readable storage media. Executable instructions 622 can further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus.

Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to operate an autonomous vehicle (AV), the method comprising:
    maintaining, by a data processing system of the AV, the AV on a highway, wherein the highway is a part of a first route to a route destination;
    obtaining, by the data processing system of the AV, an identification of an unfavorable condition for the first route, wherein the unfavorable condition causes a delay of travel of the AV on the highway;
    responsive to the obtained identification of the unfavorable condition, directing, using an AV control system, the AV to follow a waiting loop route for a period of time;
    reevaluating, while the AV is driving the waiting loop route, the unfavorable condition; and
    responsive to the reevaluating of the unfavorable condition, making a determination to direct the AV to one of i) the first route or ii) a second route to the route destination.

2. The method of claim 1, wherein the waiting loop route comprises a portion of the highway between a first highway exit and second highway exit driven in a first direction of travel during a first plurality of times.

3. The method of claim 2, wherein the waiting loop route comprises the portion of the highway driven in a second direction of travel during a second plurality of times.

4. The method of claim 2, wherein the waiting loop route comprises a road between the first highway exit and the second highway exit, wherein the road is different from the highway.

5. The method of claim 1, wherein at least a portion of the waiting loop route is not on the highway.

6. The method of claim 1, wherein the identification of the unfavorable condition is obtained from at least one of a dispatch center or another vehicle, and wherein the unfavorable condition comprises one or more of: a traffic blockage, a traffic slowdown, a traffic detour, an adverse weather condition, or a forecast of an adverse weather condition.

7. The method of claim 1, wherein obtaining the identification of the unfavorable condition for the first route comprises:
    collecting, using a sensing system of the AV, a sensing data imaging a portion of the first route; and
    identifying, by the data processing system of the AV and using the collected sensing data, that the first route includes at least one of a traffic blockage or a traffic detour.

8. The method of claim 1, further comprising:
    responsive to determining that the unfavorable condition has resolved,
    causing the AV to exit the waiting loop route and resume the first route.

9. The method of claim 1, further comprising:
    responsive to determining that the unfavorable condition has not resolved over a target time; and
    causing the AV to exit the waiting loop route and travel on the second route that is different from the first route.

10. The method of claim 1, further comprising:
    determining that the unfavorable condition has not resolved over a target time; and
    communicating a request for assistance to a control center.

11. A system comprising:
    an autonomous vehicle (AV) control system of the AV;
    a data processing system of the AV, communicatively coupled to the AV control system, wherein the data processing system is configured to:
        maintain the AV on a highway, wherein the highway is a part of a first route, the first route having a route destination;
        obtain an identification of an unfavorable condition for the first route, wherein the unfavorable condition causes a delay of travel of the AV on the highway; and
        responsive to the obtained identification of the unfavorable condition, directing the AV control system to select a waiting loop route for a period of time;
        reevaluate, while the AV is driving the waiting loop route, the unfavorable condition; and
        responsive to the reevaluated unfavorable condition, make a determination to direct the AV control system to select one of i) the first route or ii) a second route to the route destination; and
    the AV control system of the AV to:
        cause the AV to follow the selected waiting loop route for the period of time.

12. The system of claim 11, wherein the waiting loop route comprises a portion of the highway between a first highway exit and a second highway exit driven in a first direction of travel during a first plurality of times.

13. The system of claim 12, wherein the waiting loop route comprises the portion of the highway driven in a second direction of travel during a second plurality of times.

14. The system of claim 12, wherein the waiting loop route comprises a road between the first highway exit and the second highway exit, wherein the road is different from the highway.

15. The system of claim 11, wherein at least a portion of the waiting loop route is not on the highway.

16. The system of claim 11, wherein the identification of the unfavorable condition is obtained from at least one of a dispatch center or another vehicle, and wherein the unfavorable condition comprises one or more of: a traffic blockage, a traffic slowdown, a traffic detour, an adverse weather condition, or a forecast of an adverse weather condition.

17. The system of claim 11, wherein to obtain the identification of the unfavorable condition for the first route, the data processing system is configured to:

collect, from a sensing system of the AV, a sensing data imaging a portion of the first route; and identify, using the collected sensing data, that the first route includes at least one of a traffic blockage or a traffic detour.

18. The system of claim 11, wherein the data processing system is further configured to:

responsive to determining that the unfavorable condition has resolved, cause the AV to exit the waiting loop route and resume the first route.

19. The system of claim 11, wherein the data processing system is further configured to:

responsive to determining that the unfavorable condition has not resolved over a target time, cause the AV to exit the waiting loop route and travel on the second route that is different from the first route.

20. A non-transitory computer-readable memory configured to store instructions that, when executed by a processing device a data processing system of an autonomous vehicle (AV), are to cause the processing device to perform operations comprising:

maintaining the AV on a highway, wherein the highway is a part of a first route, the first route having a route destination;

obtaining an identification of an unfavorable condition for the first route, wherein the unfavorable condition causes a delay of travel of the AV on the highway;

responsive to the obtained identification of the unfavorable condition, directing, using an AV control system, the AV to follow a waiting loop route for a period of time;

reevaluating, while the AV is driving the waiting loop route, the unfavorable condition; and responsive to the reevaluating of the unfavorable condition, making a determination to direct the AV to one of i) the first route or ii) a second route to the route destination.

* * * * *